Dec. 6, 1966   R. Z. EZQUERRA   3,290,050
VEHICLE FOR TRANSPORTING A BABY
Filed Dec. 1, 1964   3 Sheets-Sheet 1
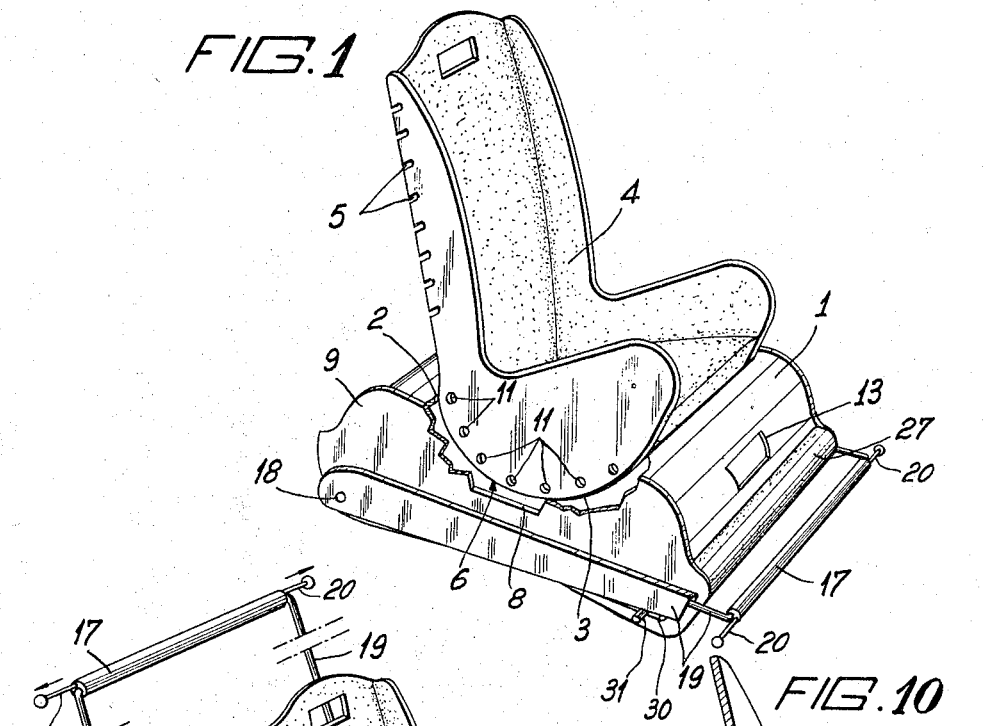
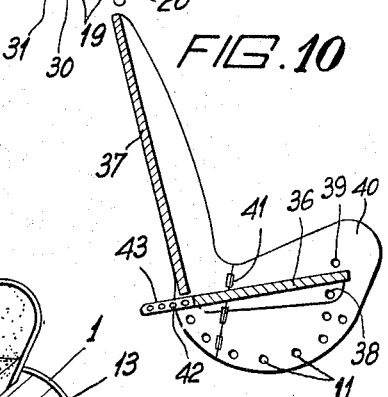
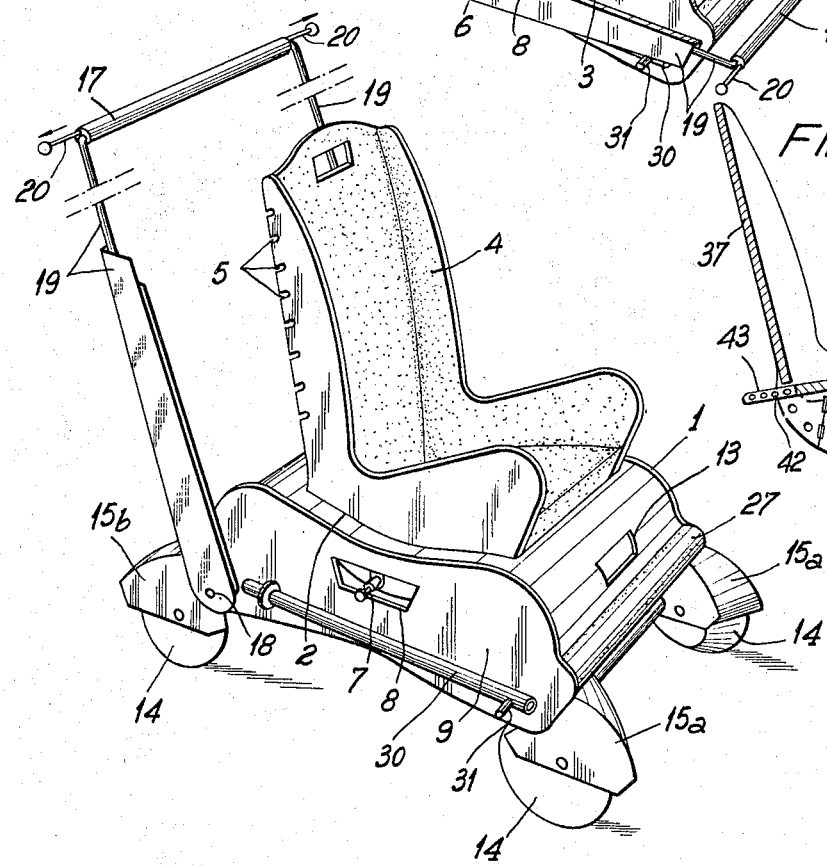

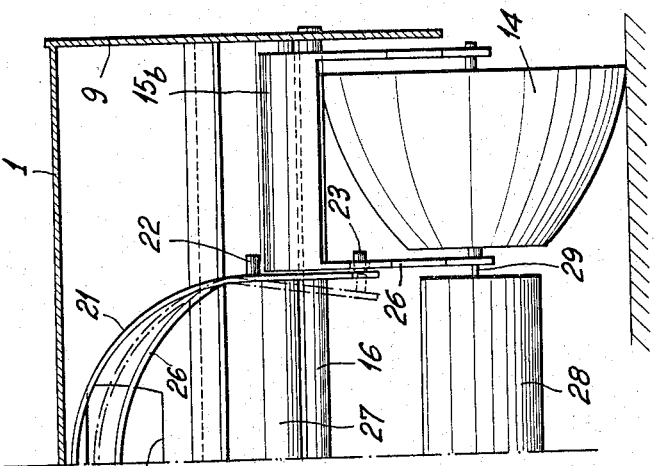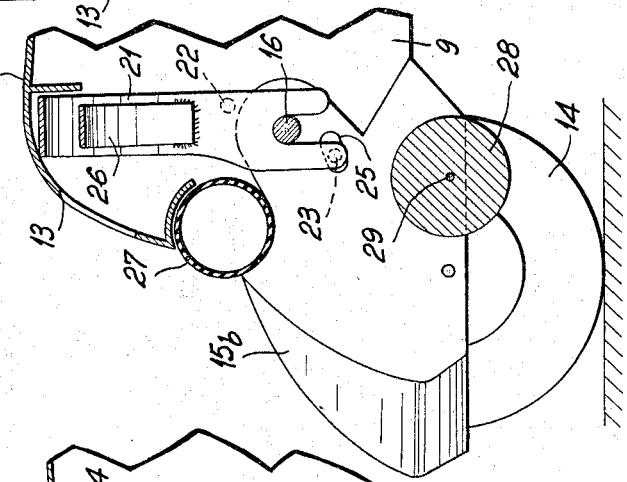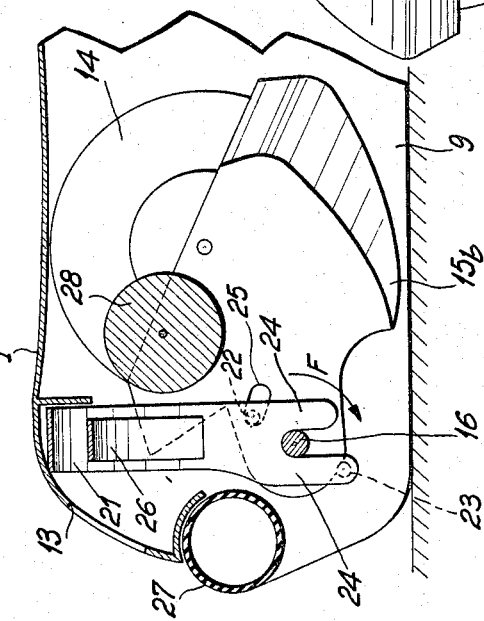

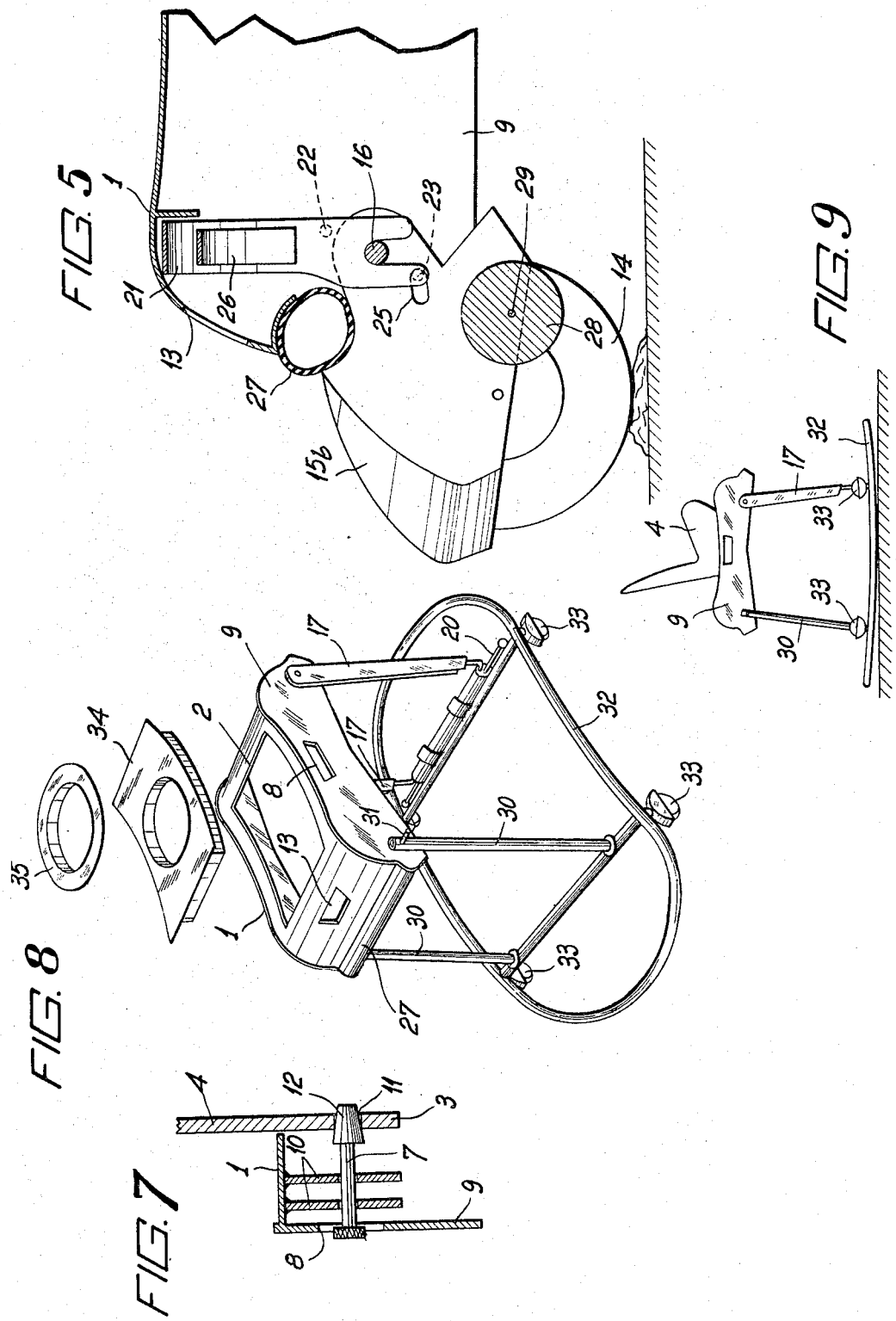

United States Patent Office 3,290,050
Patented Dec. 6, 1966

3,290,050
VEHICLE FOR TRANSPORTING A BABY
Raymond Z. Ezquerra, Tours, France, assignor to Oregon Merchandisers, Inc., a corporation of California
Filed Dec. 1, 1964, Ser. No. 415,007
3 Claims. (Cl. 280—30)

This invention relates to devices for transporting a baby, and has particular reference to a stand for baby's seats which is designed with a view to increase the possibilities of use of this seat and to facilitate the transport of a baby.

Baby's seats are already known which comprise adequate means for mounting or suspending them on or from special supports. Seats of this character are adapted to be secured on the back of an automobile seat so that a baby can conveniently be transported in a vehicle. However, when it is desired to transport the baby outside the vehicle he must be removed from his seat and placed on a folding perambulator or pram. Under these conditions, this transfer involves a number of handling steps.

It is the essential object of this invention to provide a stand for a baby's seat which is adapted to avoid these handling steps and the use of a pram. This stand is also adapted to be used as a seat-supporting structure and to impart a reliable stability to a baby's seat without requiring any other fixation means. This stand is also designed with a view to afford a number of different transformations increasing considerably its possibilities of use.

The device according to this invention is characterized in that it comprises a baby's seat consisting of a hollow body open at its lower portion and carrying on its upper portion means for securing a baby's seat proper, said hollow body incorporating four wheels mounted in brackets pivoted on said body and adapted to be set in different positions, notably a positoin wherein the wheels are retracted inside the stand, and another position in which said wheels are released and project from the lower end of the stand so as to be capable of rolling on the floor, the stand constituting in this other position a kind of cart or perambulator for transporting the baby sitting on a seat secured on said stand.

According to another feature of this invention said stand comprises a handlebar with telescopic side arms which is pivotally mounted on the sides of one end of the stand, said handlebar being adapted to be set either in a contracted and folded position in which it is adjacent to the side portions of the stand, or in an extended and spread position in which it can be used as a handlebar proper for maneuvering the stand when the latter is converted into a cart or pram.

Other features and advantages of the stand according to this invention will appear as the following description proceeds with reference to the accompanying drawings forming part of this specification and illustrating diagrammatically by way of example typical forms of embodiment of this stand. In the drawings:

FIGURE 1 is a perspective view showing the stand of this invention, on which a baby's seat is mounted;

FIGURE 2 is another perspective view showing the same stand converted into a perambulator;

FIGURE 3 is a fragmentary sectional view taken upon a vertical longitudinal plane, showing on a larger scale details of the mounting of a wheel, the latter being in its retracted position;

FIGURES 4 and 5 are similar views showing the same wheel after the same has been pulled out for converting the stand into a pram;

FIGURE 6 is a fragmentary sectcional view taken upon a vertical transverse plane;

FIGURE 7 is a vertical section showing the means for securing the seat on the stand;

FIGURE 8 is a perspective view showing the transformation of the stand of this invention into a baby's go-cart;

FIGURE 9 illustrates a special support for this stand, and

FIGURE 10 is a vertical section showing a specific form of embodiment of a baby's seat provided in combination with the stand of this invention.

The stand illustrated in the drawings comprises essentially a hollow body 1 open at its lower portion. The upper portion of this stand comprise a relatively large aperture 2 adapted to receive the lower portion 3 of a baby's seat 4.

This seat 4 may be of any suitable type. Thus, it may consist notably of a seat specially designed for conveniently carrying a baby fastened thereto, this seat comprising series of holes or notches 5 permitting of fastening or suspening the seat on or from a supported provided to this end.

However, this seat 4 is specially designed as a function of the stand 1, the assembly constituting a convenient means for transporting a baby. In this case the lower portion of the side walls of the seat 4 have a curved contour 6 and the dimensions of the aperture 2 formed in the lower portion of the stand are such that the lower portion 3 of the seat fits therein. Due to the curved contour of its lower edge the seat can thus be set in different angular positions, the edges of its lower portion bearing at its front and rear ends on the corresponding edges of the aforesaid aperture 2 of said stand.

The seat is locked in the desired angular position on the stand by means of a pair of detachable spindles 7 each adapted to engage a corresponding aperture 8 formed in the relevant side wall 9 of the stand. Thus, each spindle is adapted slidably to engage holes formed in a pair of depending vertical lugs 10 rigid with the stand, and to engage one of the holes of a row of holes 11 formed along the lower edges of the seat 4.

Under these conditions the seat can be locked in the desired angular position with respect to the stand. In fact, according to the selected seat position, one of the holes 11 can be brought to a position of alignment with the lugs 10 guiding the spindles 7. Preferably, the end of each spindle 7 carries an end piece 12 of frustoconical configuration whereby it can be easily and properly engaged and wedged in the corresponding hole 11, this end piece being advantageously of elastic or plastic material.

At the front and rear ends of the stand an aperture 13 is provided, these two apertures constituting convenient means for gripping the stand with the two hands for transporting the stand and the seat on which the baby may be fastened by using adequate straps or other means. Of course, the apertures 8 formed through the side walls may also be used as gripping means for transporting the stand.

The stand incorporates four wheels 14 rotatably mounted each on a separate bracket or like support. Each bracket consists of a "fender" like member and the assembly comprises two front brackets 15a and two rear brackets 15b.

The rear wheel fenders 15b and the front wheel fenders 15a are pivotally mounted on transverse pins 16. The position of each pivot pin 16 is so calculated that the different wheel fenders 15a and 15b can be retracted completely with the relevant wheels 14 inside the stand 1 (see FIGURES 1 and 3). In this position the fenders are turned completely upside down, with their open portion facing upwards. Thus, these fenders will retain the mud or water dripping from the wheels.

However, by pivoting the fenders about their pins 16, these fenders can be rotated in the direction of the arrow F to a position in which they project from the lower portion of the stand. Thus, the fenders are in their normal position with the wheels 14 projecting from this lower portion and adapted to roll on the floor (see FIGURES 2, 4 and 6). Under these conditions the stand is converted into a carriage and may be used as a kind of perambulator, since the baby's seat 4 is secured thereon.

On the other hand, the stand 1 carries a maneuvering handlebar 17 having its side arms pivotally mounted at their lower ends on pivot pins 18 carried by the side walls 9 of the stand. On the other hand, the side arms of this handlebar consist of a pair of members 19 adapted to slide in each other so that these side arms constitute telescopic assemblies.

Thus, it is possible to fold the side arms of the handlebar against the side walls 9 of the stand and to reduce the length of this handlebar by taking advantage of the telescopic structure of their side arms 19 when the stand of this invention is used simply as a support for the baby's seat 4 (see FIGURE 1). Stop members 20 are provided for locking the handlebar in this retracted or inoperative position.

The stand contains other locking means for holding the wheel supporting members 15a, 15b in their two operative positions, that is, the retracted position inside the stand (FIGURE 1) and the external or spread position (FIGURE 2). Thus, two series of locking means are provided respectively at the front and rear portions of the device for locking against motion on the one hand the front wheel fenders 15a and on the other hand the rear wheel fenders 15b.

These locking means may consist at each end of an elastic bow 21 extending transversely within the stand and having its ends provided with studs 22, 23 adapted to lock the corresponding wheel fenders 15a or 15b. The ends of each bow 21 are fork-shaped and the prongs 24 of each forked end extend on either side of the pivot pin 16 of the corresponding wheel fenders, thus holding each bow in position and guiding same during its deformations.

In the retracted position of the wheels the stud 22 on each end of a bow 21 engages an elongated aperture 25 formed in the adjacent wall 26 of the corresponding fender 15. On the other hand, the stud 23 is then located under the lower edge of the same wheel fender. Thus the latter is perfectly held in its retracted position within the stand 1.

It may be noted that the bows 21 are adapted resiliently to urge the wheel fenders or like supports against the inner walls of the stand.

On the other hand, in the spread position of the wheels 14 it is the stud 23 at the end of the elastic bows 21 that engages the elongated aperture 25 of the corresponding wheel support. This will also keep the wheel in its spread or operative position. However, it may be noted that, due to the elongated shape of apertures 25 the wheel fenders or like support can pivot to a certain extent about their pivot pins 16.

Mounted inside each elastic bow 21 is a strap 26 having its lateral arms secured on those of the corresponding elastic bow. This strap is disposed at the level of the aperture 13 of the corresponding end portion of the stand 1. Under these conditions, access can be had to these straps by simply inserting the hands through the apertures 13 and thus an upward tractive effort can be exerted for controlling the momentary movement of the ends of each elastic bow 21 toward each other and releasing the locking studs 22, 23 out from their recesses in the corresponding wheel fenders.

In the spread position of wheels 14 each wheel support or fender 15a, 15b bears with its upper portion on an elastic member in order to constitute a kind of suspension system between the stand and its wheels. This elastic member may consist of a rod or tube 27 of elastic material extending across each end portion of the stand 1. If desired this tube 27 may be closed to constitute a kind of bladder, thus providing a pneumatic suspension system for the stand. This pneumatic tube may be inflated as desired at the proper pressure by means of a valve.

It may be noted more particularly that each wheel support or fender may be pivoted independently of the others on the corresponding pivot pin 16. Under these conditions the stand comprises an independent suspension for each wheel. As already explained hereinabove, the elongated shape of apertures 25 actually permits the necessary movements of each wheel support (see FIGURE 5).

Preferably, each wheel 14 has the shape of a spherical zone. This shape is advantageous in that it permits of utilizing the pram-forming stand and seat assembly on various types of floors and grounds. In fact, on a hard floor the wheels will contact the floor surface only with their outermost portion having the maximum diameter. On the other hand, on a softer ground the wheels will tend to sink more or less into the soil material and the contact takes place through a greater surface area, their spherical shape permitting in this case a satisfactory rolling engagement.

Also preferably, there is provided between the two wheels of a same front or rear axle a horizontal roller 28 rotatably mounted on a shaft 29 carried by the corresponding wheel supports or fenders. This roller is adapted to limit the sinking of the perambulator wheels in particularly soft grounds by increasing the bearing area on this ground. Under these conditions this pram may be used even on very soft grounds, for example on a beach.

As will be readily understood the stand according to this invention is particularly useful for transporting a baby to different places and also for making the baby snug in his seat, or if desired, in an automobile. In fact, in the form of embodiment illustrated in FIGURE 1 this stand can be used conveniently as a support for a baby's seat in order to hold the baby in a particularly stable manner either on the floor or on any other element such as an automobile seat. In this last instance the baby's seat 4 is held very firmly without necessitating further fastening means. This baby's seat constitutes together with the stand a unitary assembly which can be transported very easily as a whole, the baby remaining on the seat. In fact, the mother or other person in charge of the baby may then grip the stand by the gripping means consisting of either the end apertures 13 or the side apertures 8.

After having thus transported a baby in an automobile this transport may be continued beyond the place of arrival of the automobile without removing the baby from the seat 4. In fact, the stand can be converted into a pram as shown in FIGURE 2. This transformation may be effected without difficulty and without disturbing the baby, by simply engaging both hands into the end apertures 13 and operating the locking members of the wheel supports in order to release same. Thus, the wheels are caused to move to their spread or operative position outside the stand 1. After the handlebar 17 has been extracted in turn, the assembly constitutes a kind of pram permitting an easy transport of the baby.

Of course, when the person in charge of the baby reaches his or her destination, he or she can easily remove the seat 4 from the stand 1 while leaving the baby fastened on the seat, and the latter may then be secured on any other desired support.

However, the stand according to this invention may also be designed with a view to permit many other transformations. In fact, its inner space registering with the upper aperture 2 is completely unobstructed. Under these conditions, this inner space may be used as a container for stowing various objects under the baby's seat 4. Thus, if desired a chamber-pot may be disposed in this space.

If desired, the stand may also be provided at this place with a corb or any other adequate container for utilizing the stand as a transport cart or the like, after removing the baby's seat, of course. Alternatively, this stand may be used as a seat or armchair, the handlebar 17 being raised to constitute the back thereof.

Preferably, the stand 1 carries two legs 30 pivotally mounted at 31 laterally of its end opposite to the end carrying the handlebar 17. These legs are adapted to be folded to a horizontal position so as to extend along the side walls of the stand like the side arms of handlebar 17 (FIGURE 1). However, these legs, as well as the handlebar 17, are also adapted to be set in the position shown in FIGURE 8 to constitute a support holding the body 2 at a certain level, so that this body 2 may be used as a seat or table, a tray being added to its upper face.

Rertactable rods 20 may be slidably mounted in the ends of the intermediate element of handlebar 17. These rods are adapted to be pulled outwards to act as stabilizer when the handlebar sides are used as supporting legs.

The lower ends of these front and rear legs may also be secured on a support consisting of a frame 32 mounted on casters 33 (see FIGURE 8). In this case the assembly constitutes a baby "go-cart," the baby's body being retained by the upper aperture 2 of the stand. Preferably, a hollowed plate or board 34 is disposed in this aperture and a rotary flanged annular member 35 is inserted in the central aperture of the plate or board 34 for surrounding the baby's body and permit his free movements.

The frame 32 may advantageously have a curved configuration instead of a flat shape. Thus, by simply mounting the frame upside down (see FIGURE 9) the frame may engage the floor with its convex face.

Under these conditions the frame is secured on the lower or outer ends of the legs 30 and handlebar 17 to constitute a kind of rocking chair permitting the swinging of the baby who may be again placed on the seat 4 secured on the stand 1 as shown in FIGURE 1.

In any case, the stand according to this invention may be transformed in many other ways, as already pointed out hereinabove, by adding adequate detachable elements thereto. On the other hand many modifications may be brought to the stand according to this invention, some of its component elements being replaceable by other equivalent elements adapted to perform the same functions.

Similarly, the seat 4 may be modified in many different manners. Thus, FIGURE 10 illustrates an advantageous form of embodiment wherein the seat comprises a portion 36 constituting the seat proper which is hingedly mounted on a back-forming portion 37. Thus, the seat 36 may be set in different angular positions relative to the back, suitable locking means being provided for holding the back in the desired position. These means may consist of pegs or spindles 38, or any other suitable means, engaging holes 39 formed in the side walls 40 rigid with said back.

Preferably, these side walls are divided into two portions interconnected by hinge means 41 whereby their lower portion may be folded against the back when the seat 36 proper is raised completely.

The hinge means provided between the seat and back proper may consist for example of a rod 42 engaging simultaneously lugs 43 carried the ones by the back and the others by the seat. The seat lugs may advantageously comprise a series of holes whereby the position of said hinge rod 42 may be changed at will for adjusting the useful length of the seat.

What I claim is:

1. A device for transporting a baby, comprising a stand for baby's seat consisting of a hollow body open at its lower portion and carrying at its upper portion means for securing a baby's seat, said hollow body incorporating four wheels mounted in supports pivotally mounted on said body and adapted to be set in different positions, namely a position in which said wheels are retracted inside said stand and another position in which said wheels are released and project from the lower portion of said stand to engage the floor, said stand constituting in this other position of said wheel supports a kind of cart adapted to constitute a perambulator for transporting the baby sitting in the seat secured on said stand the upper portion of said stand comprising a relatively large aperture adapted to receive the lower end of a baby seat, said means for securing said seat on said stand consisting of detachable spindles adapted to engage corresponding holes formed in said body and in the lower portion of said seat.

2. A device for transporting a baby comprising in combination a baby's seat of which the lower portion is rounded, and a stand for said baby's seat, this stand consisting of a hollow body open at its lower portion and carrying at its upper portion means for securing a baby's seat, said hollow body incorporating four wheels mounted in supports pivotally mounted on said body and adapted to be set in different positions, namely a position in which said wheels are retracted inside said stand and another position in which said wheels are released and project from the lower portion of said stand to engage the floor, said stand constituting in this other position of said wheel supports a kind of cart adapted to constitute a perambulator for transporting the baby sitting in the seat secured on said stand, the upper portion of said stand comprises a relatively large aperture adapted to receive the lower end of a baby's seat, said means for securing said seat on said stand consisting of detachable spindles adapted to engage corresponding holes formed in said body and in the lower portion of said seat, which may be set in different inclined positions on the edges of the aperture provided at the upper portion of said stand, as the lower portion of said seat is rounded.

3. A device for transporting a baby, comprising a stand for baby's seat consisting of a hollow body open at its lower portion and carrying at its upper portion means for securing a baby's seat, said hollow body incorporating four wheels mounted in supports pivotally mounted on said body and adapted to be set in different positions, namely a position in which said wheels are retracted inside said stand and another position in which said wheels are released and project from the lower portion of said stand to engage the floor, said stand constituting in this other position of said wheel supports a kind of cart adapted to constitute a perambulator for transporting the baby sitting in the seat secured on said stand, each wheel being rotatably mounted in a separate support pivoted on the stand and having substantially the shape of a fender, each fender-like support being turned upwardly completely in the retracted position of said wheels in said stand, said stand incorporating locking means adapted to hold against motion said wheel supports in their end positions, said locking means consisting of a pair of elastic bows disposed transversely in the vicinity of each end of said stand and having their upper portion adapted to be acted upon through apertures formed in the end walls of said stand, each bow carrying at its ends stud means adapted to engage corresponding holes formed in the supports of the two wheels of the corresponding end of said stand.

References Cited by the Examiner

UNITED STATES PATENTS

| | | | |
|---|---|---|---|
| 2,415,146 | 2/1947 | Nanna | 280—47.38 X |
| 2,605,812 | 8/1952 | Benze | 297—133 X |
| 2,759,738 | 8/1956 | Reiter | 280—30 X |
| 2,771,124 | 11/1956 | Rorsani | 297—313 |
| 2,902,286 | 9/1959 | Wood | 280—31 |
| 2,969,830 | 1/1961 | Thompson | 297—129 X |
| 3,100,651 | 8/1963 | Reese | 280—47.37 X |

KENNETH H. BETTS, *Primary Examiner.*